United States Patent [19]
Hazelett et al.

[11] Patent Number: 4,883,283
[45] Date of Patent: * Nov. 28, 1989

[54] HITCH AND SUSPENSION FOR ONE-WHEEL CYCLE TRAILERS

[75] Inventors: S. Richard Hazelett, P.O. Box 8, Colchester, Vt. 05446; Bernhard Bender, Essen-Heidhausen, Fed. Rep. of Germany; John V. Savage, Hinesburg, Vt.

[73] Assignee: S. Richard Hazelett, Colchester, Vt.

[ * ] Notice: The portion of the term of this patent subsequent to Nov. 8, 1990 has been disclaimed.

[21] Appl. No.: 214,482

[22] Filed: Jul. 1, 1988

[51] Int. Cl.$^4$ .............................................. B62D 63/08
[52] U.S. Cl. ........................... 280/204; 248/231.6; 269/128; 280/492; 280/78; 403/408.1
[58] Field of Search ................... 269/126, 127, 128; 280/204, 292, 293, 402, 492, 78; 24/658, 665; 248/231.6, 316.6; 403/54, 170, 174, 218, 373, 408.1

[56] References Cited
U.S. PATENT DOCUMENTS

| | | | |
|---|---|---|---|
| 1,624,252 | 4/1927 | Kenerson | 269/128 X |
| 2,024,112 | 12/1935 | Phillis | 269/128 X |
| 3,848,890 | 11/1974 | MacAlpine | 280/204 |
| 4,074,897 | 2/1978 | Behn | 269/128 X |
| 4,413,835 | 11/1983 | Hazelett | 280/204 |

Primary Examiner—Charles A. Marmor
Assistant Examiner—Michael Mar

[57] ABSTRACT

In conjunction with a cycle trailer having a frame the front reach of which consists of rounded tubing or bar, a universal-joint hitch consisting essentially of two diametrically opposed wafer-like sector bearings each of which contains on its face multiple diametrally disposed sector channels, in order to render easy the assembly of the trailer to one such sector channel in the bearings. The bearings include trunnions and integral annular thrust surfaces on their opposite faces. Through the thrust surfaces, the bearings are constrained to bear on the rounded tubing or bar of the frame from opposite directions by clamping and mounting arrangements which may include a hinge on one side of the bearings and a hand nut on the opposite side. This hand nut, when employed, is restrained from unwanted loosening by contrived interference or engagement, most conveniently through glancing interference of protrusions of its handle with the trunnion of one sector bearing. The hitch may be mounted sandwich-wise to the rear frame of the cycle by a single bolt and a sandwich plate or member which embraces a slot disposed in such wise that easy but secure assembly of the hitch to the cycle is enabled. A convenient arrangement is described for suspending a bag from the frame of a trailer while allowing easy removal of the bag when desired.

3 Claims, 4 Drawing Sheets

HITCH AND SUSPENSION FOR ONE-WHEEL CYCLE TRAILERS

BACKGROUND OF THE INVENTION

The referenced invention of the basic cycle trailer hitch by Hazelett, disclosed in U.S. Pat. No. 4,413,835, has continued to prove highly serviceable, with its combination of strength, rigidity, durability, simplicity, and lightness. It remains the key to the success of a one-wheel trailer towed or pulled by a cycle. Together with a suitable one-wheel trailer as described in the aforesaid patent, the universal-jointed hitch described in the aforesaid patent has proven readily capable of holding upright and safely hauling cargoes of up to 90 lbs. or 40 kilograms when attached to a typical bicycle.

BRIEF DESCRIPTIONS OF THE DRAWINGS

DETAILED DESCRIPTION OF THE INVENTION

The hitch as described in U.S. Pat. No. 4,413,835 is the subject of several improvements as described herein. These improvements render it more versatile and more easily assembled, hitched and unhitched by the user, whether the towing vehicle is to be a bicycle, a motorcycle, moped, or motor scooter.

Figure 1:
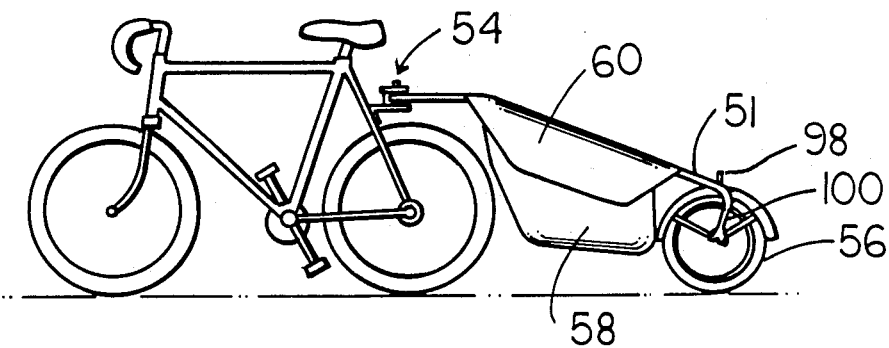
FIG. 1 is a side elevation showing a bicycle coupled to the one-wheel trailer made feasible by the hitch that is the subject of this invention.
Figure 2:
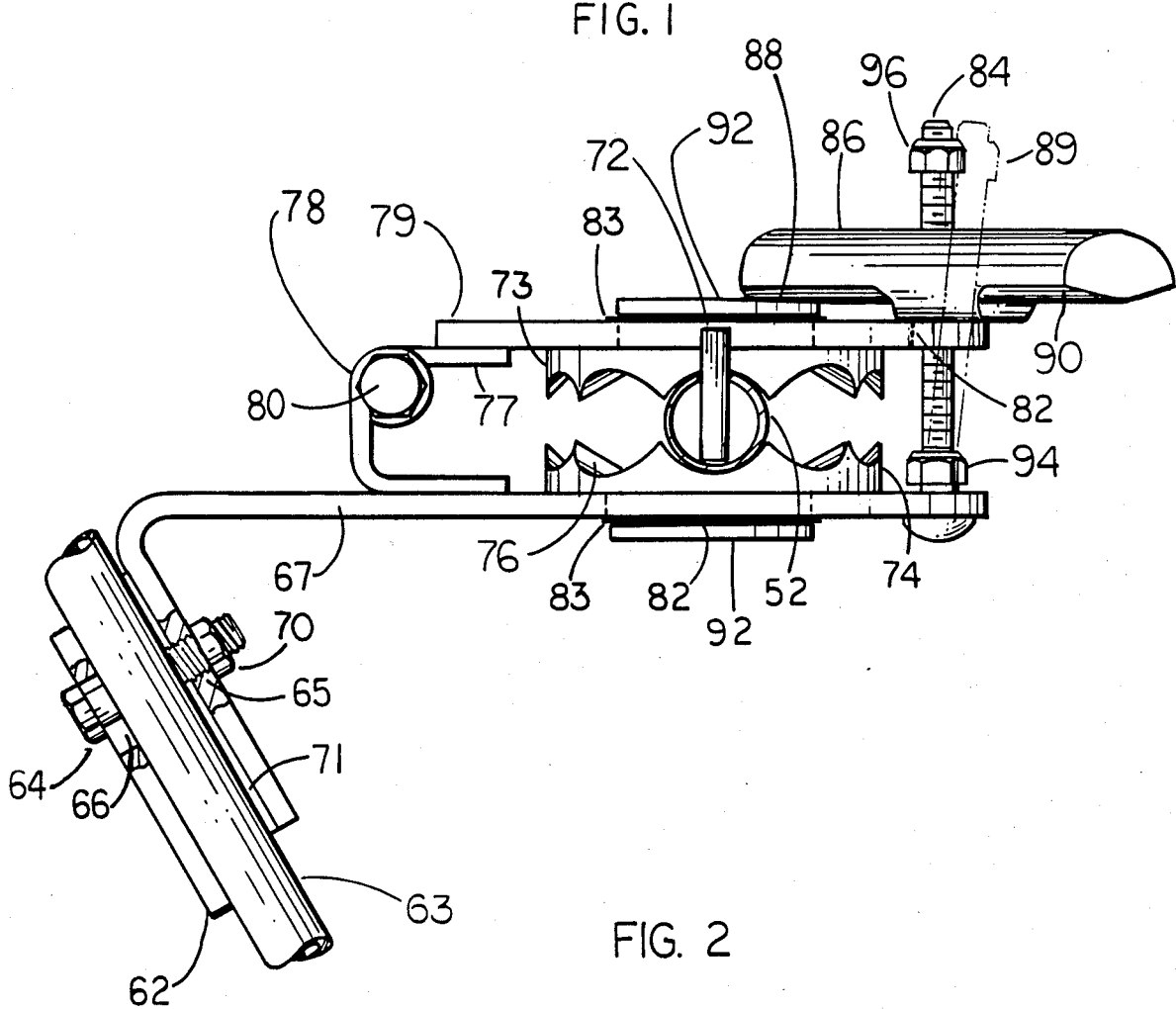
FIG. 2 is a side elevation of the hitch from the left side. The near side of the trailer frame has been sectioned away in this view.

The trailer frame 51 in FIG. 1 is supported at its front end 52 by hitch 54 and at its rear end by wheel 56. The frame in turn supports a bag 58 with covering flap 60. The trailer is typically much longer than it is wide. Further details of a suitable trailer are disclosed in U.S. Pat. No. 4,413,835, which is incorporated herein by reference. The present patent describes improved mechanisms of the hitch and suspension.

In its central aspect, the present invention facilitates the assembly and hitching of the trailer. The nine aspects of the invention all contribute to this end, though they need not all be used together. First, a sandwich plate or member 62, which may be round (FIG. 3), cooperates with a single bolt 64 to fasten the hitch to the frame 63 of the cycle, which normally consists of tubing. This plate 62 replaces elements (27), (28), (29), (31), and (33) of the prior patent.

Second, a slot 66 (FIG. 3) in plate 62 further facilitates assembly; the widened area 68 of this slot passes the head of bolt 64 and so enables sandwich plate 62 to be assembled without removing bolt 64 from threaded hole 65 in tongue 67 (which tongue is also referred to herein as the first bearing-confining means). A further feature which may be included in such a slot is an angular elongation—an L-shape as at 69—with said widened portion being placed at the end of the L. This configuration ensures against accidental dropping of the trailer in the event that looseness occurs. A stop nut 70, which may be a nylon-collar nut, secures the attachment.

Third, a rubber pad 71, glued to tongue 67, successfully replaces the four separate mounting shoes (30) of the prior patent.

Fourth, two upright pins 72 expediently guide the hitching of the front reach 52 of the frame 51 as it is moved forward into the hitch. The pins are guided by the periphery of the cap 79. These replace welded tits (32) of the prior patent. (The cap 79 is otherwise known herein as the second bearing-confining means.)

Figure 3:
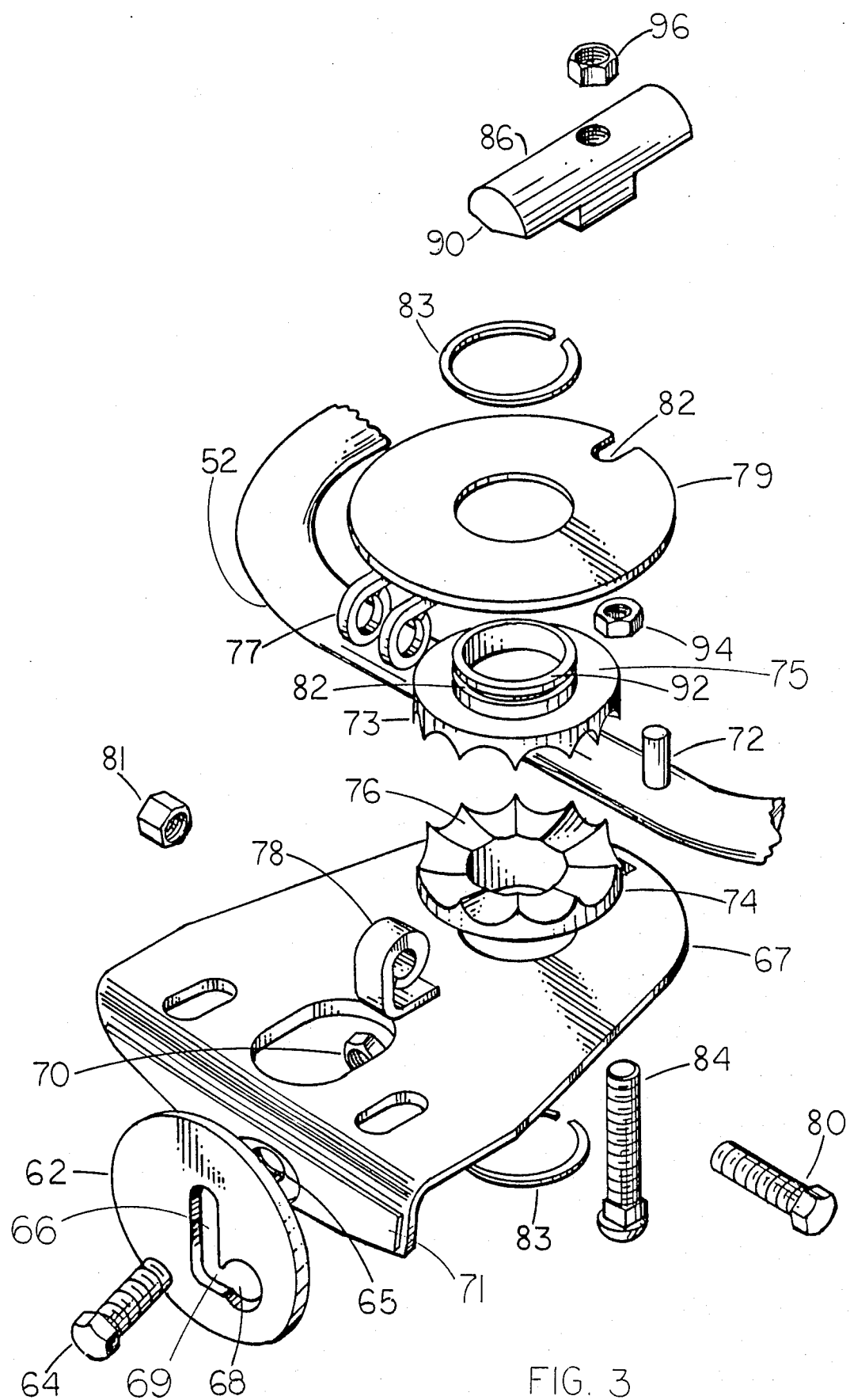
FIG. 3 is an oblique exploded view of the hitch from the left and above.
Figure 4:
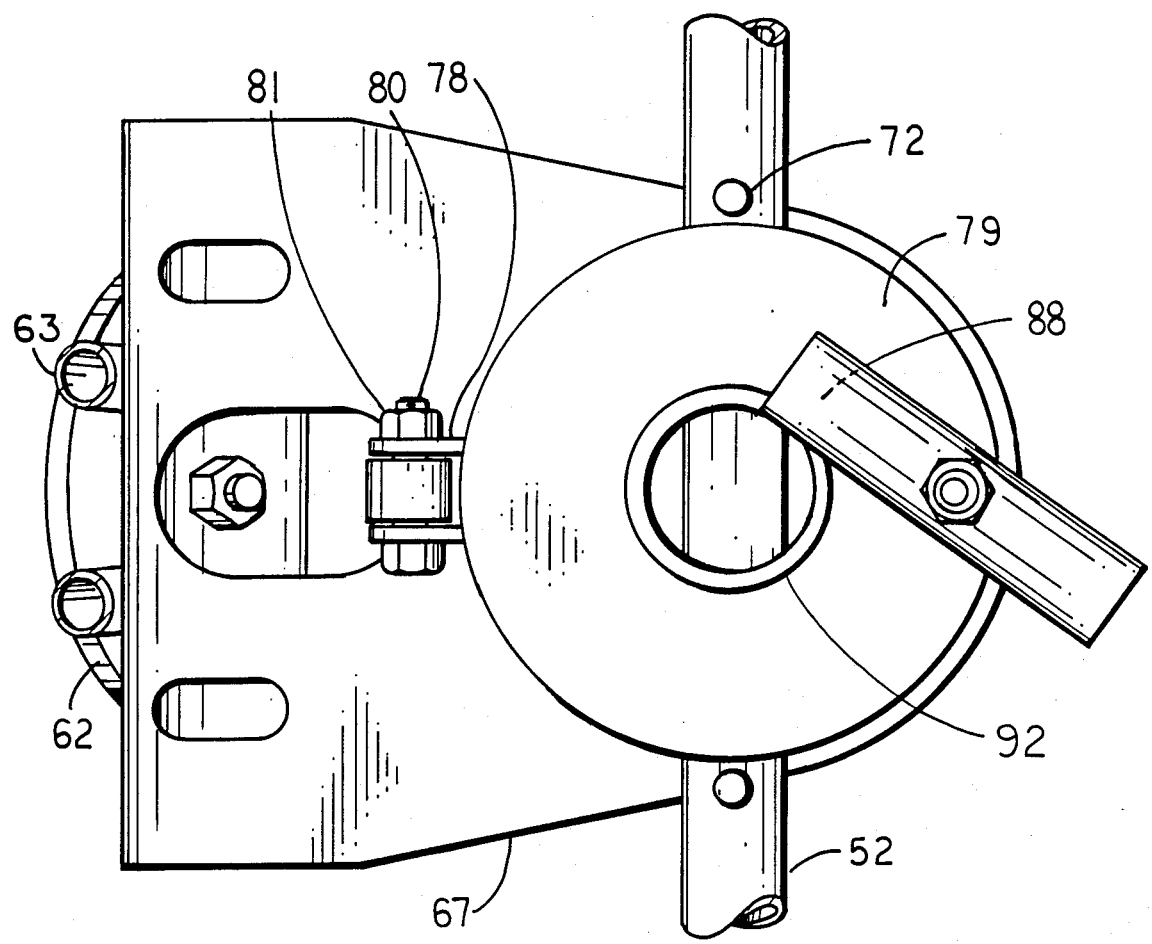
FIG. 4 is a top view of the hitch.
Figure 6:
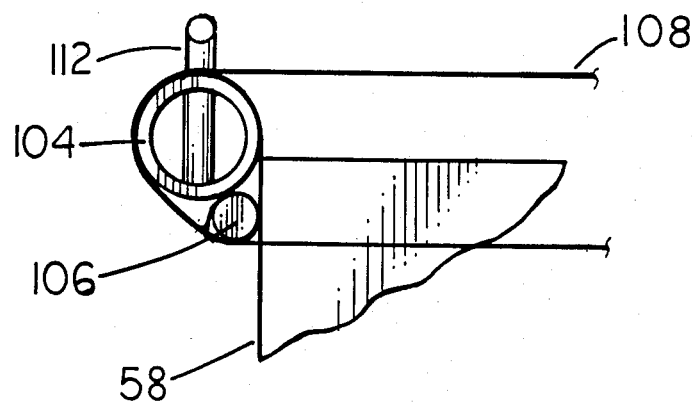
FIG. 6 is a front view of a portion of the rear of the trailer as indicated in FIG. 5, showing the detail of the bag suspending arrangement.

Fifth, upper sector journal bearing member 73 and lower sector journal bearing member 74, preferably of acetal plastic, each contain on their opposite, outward faces a central, annular thrust surface 75, and on their inward faces a series of diametral concave sectors or grooves 76 which are effectively (and preferably) cylindrical. These grooves are so proportioned as to conform to and capture the front reach 52 of the trailer frame 51. These wafer-like bearing members may advantageously be made with five equally spaced diametral sector journal grooves, as shown, but some other number may serve. In the design as illustrated in FIG. 3, these grooves 76 are interrupted where they pass through the center of the bearing members 73 and 74, whereby what are effectively five diametral grooves may be alternatively described as ten radial grooves. The purpose of multiplying these grooves 76 beyond the single diametral groove (15) in the prior patent is to make it unnecessary for the customer, when hitching the trailer, to turn both of these bearings to a specific orientation. With at most a little jiggling of the front reach 52 of the frame, the customer can seat the frame into the lower bearing 74 and then into upper bearing 73. That is, these multiply grooved bearing members can capture the front reach of the frame at correspondingly multiple positions of angular rotation of the bearing members. These bearing members replace items (14) of the prior patent.

C-ring 83 nests in groove 82 to capture each bearing member 73 and 74, as in the prior patent. In this way, unwanted disassembly during hitching and unhitching is prevented.

Sixth, a hinge consisting of elements 77 and 78 facilitates the hitching process by defining a path of angular motion of top cap or disc 79 during the process of hitching or unhitching. Hinge manufacturers can readily supply an desired configuration of some standard cross-sections. The thickness and material of the hinge material may be made comparable to that of the other bearing confining means 67 and 79, when these are made of plate. These plate pieces may be of low-carbon steel, though the present invention is not confined to the use of plate or of steel. The hinge replaces the forward clamping threaded bolt (24) of the prior patent. The hinge pin 80 may be a screw secured by a stop nut 81.

Seventh, a slot 82 in the rear of the cap or disc 79 enables quick disassembly and unhitching, when hand nut 86 is loosened.

Eighth, the rear clamping threaded carriage bolt of the hitch, numbered (24) in the prior U.S. Pat. No. 4,413,835, is here preferably replaced by a longer and inverted carriage bolt 84, passing upward through the cap 79. To the upper end of this bolt is assembled a threaded hand stop nut 86, which may be made of acetal plastic. It is screwed down to complete the hitching of the trailer. As this hand nut approaches tightness, it is so disposed as to intentionally collide glancingly at 88 with the end of trunnion 92 of upper bearing 73. This planned, advantageous, intermittently encountered collision 88 is slight enough to permit the hand nut to be forced past the trunnion. But the collision is obstructive enough to restrain the hand nut 86 from becoming loosened from the buffeting and stress encountered in service.

The mechanism is tolerant of the requisite intermittent collision at 88 encountered while turning hand nut 86 across the top of upper bearing 73. The reason is that the collision causes the bolt 84 to tilt a little backward (indicated by phantom lines 89) when the interference 88 is made to occur. This tilt 89 allows the end of the elongated handle of hand nut 86 to slide over the trunnion 92 of bearing 73 with modest hand force. This secures the hand nut against the forces encountered in service. The bolt 84, being under tension, is constrained to go back to its normal vertical position as soon as further turning of the hand nut separates it from the trunnion.

The sliding or glancing collision at 88 is facilitated by the slopes 90 of the lower surfaces of the hand nut 86. These slopes are typically about 15 degrees from the normal horizontal, that is, from the plane of the major portion of the tongue 67. The trunnion 92 on the bearing 73 is of such height as to contact the slopes 90 of the hand nut 86 when the hand nut is being turned and is approaching tightness.

Other means of obtaining collision or drag could be used to restrain rotation. The hand nut could be of other shapes, incorporating radial or axial protrusions other than what is inherent in an elongated handle; these could afford purchase for the aforesaid intermittent collisions.

Stop nut 94 keeps the bolt 84 captive. It is not run all the way tight against the tongue 67, since the bolt 84 must be left free enough to tilt backward through slot 82 for the purpose of unhitching. Another stop nut 86 at the top of bolt 84 keeps the hand stop nut 94 captive and also renders the area of the bolt end smooth.

Figure 5:
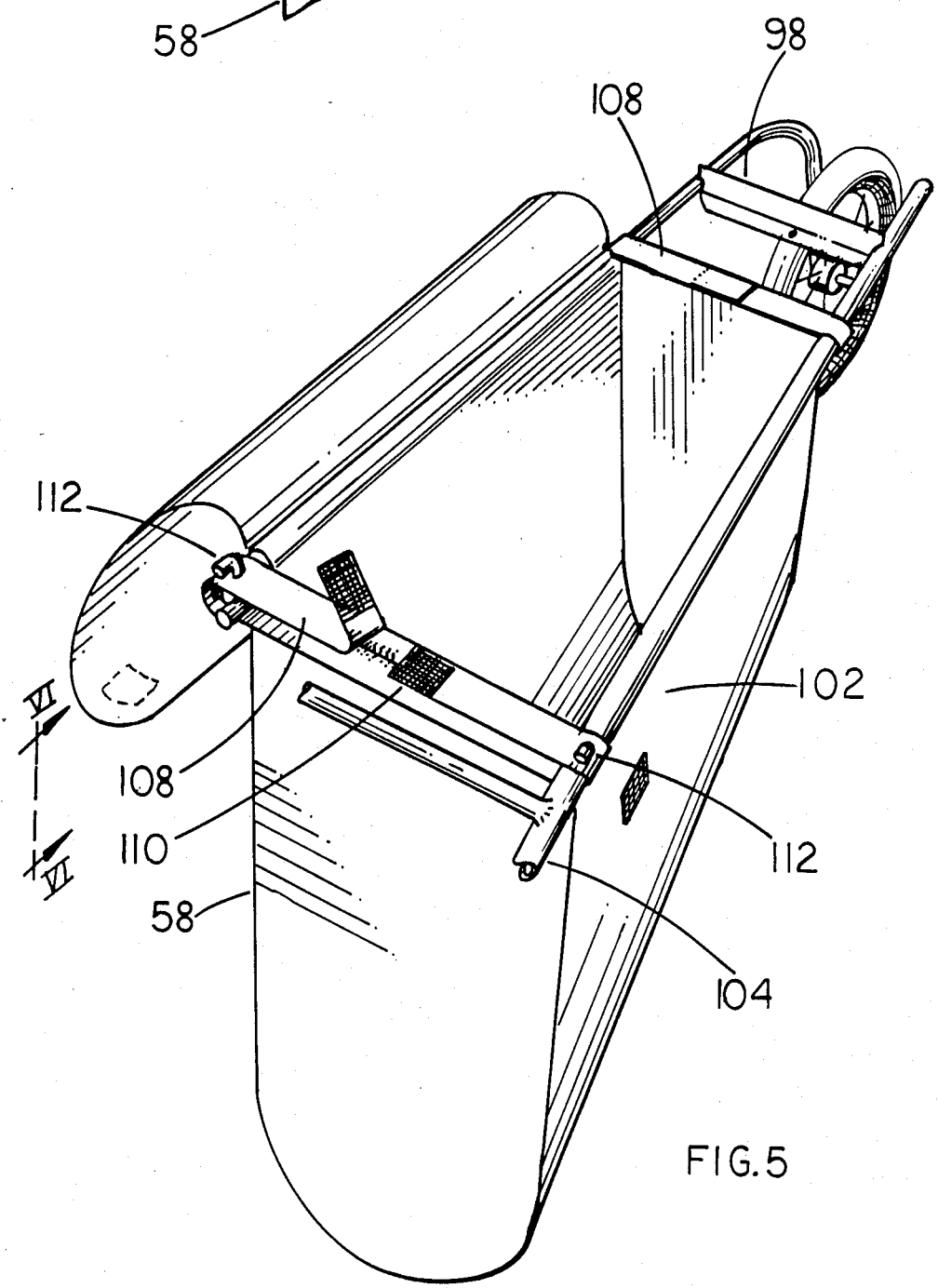
FIG. 5 shows the rear of a trailer with a removable bag in place, as seen from above the front left (port) corner.

Ninth, The versatility of a trailer utilizing the improvements described herein is increased by the employment of a readily removable soft carrying bag that is suspended in a way now to be described. In FIG. 5, the soft bag 58 may be made of vinyl-coated polyester fabric. The bag 58 has two suspending flaps 102 that wrap around the two longitudinal frame elements 104, which ordinarily consist of metallic tubing, right and left. A pair of longitudinal rods 106, preferably metallic, are secured to the edges of the flaps 102 as for instance by sewing and gluing. These rods 106 are prevented from pulling free around the frame elements 104 by straps 108 in their oval course. Straps 108 may be made of nylon webbing and are wrapped around frame elements 104 and embrace rods 106 as well. Each strap 108 is dismountable by means of the hood-and-loop (e.g. Velcro ®) tape 110. Metal hooks 112 engage the forward strap of the two straps 108 and restrain the bag assembly from slipping backward along the slope of the frame 51. The bag 58 may be sewn to strap 108 along its edge, thereby restraining the bag from sliding backward and capturing the straps.

To remove the soft bag from the trailer, the hook-and-loop tape 110 is peeled apart, releasing the strap 108. This allows each rod 106 to be brought around and over the respective frame element 104, whereby the bag 58 becomes free to be pulled upward or dropped. Generally applicable details of a usable bag are given in the aforementioned U.S. patent.

Whoever attempts to build a trailer and hitch should be warned that problems of dynamic stability may arise. At higher speeds, especially behind a motorcycle or moped, instability of the trailer may arise suddenly in the form of lateral oscillations that are quickly magnified by positive feedback of energy. In this way, both trailer and towing vehicle may be wrecked before sufficient corrective action can be taken. As a design matter, such a problem is likely correctible by increasing the torsional rigidity of the hitch or of the trailer frame. In the present design, the transverse strut 98, thoroughly welded to the frame near the wheel 56, contributes important rigidity by constraining the two rear limbs 100 of the frame to act in unison. That is, the limbs are thereby constrained to act without parallelogram-type shearing motion between them when the whole frame is subjected to torsion about a longitudinal axis. Such torsion or shearing motion tends to occur whenever the wheel is subjected to ordinary sideways dynamic forces from the roadway or from wind.

Although specific presently preferred embodiments of the invention have been disclosed herein in detail, it is to be understood that the examples have been described for purposes of illustration. This disclosure is not to be construed as limiting the scope of the invention, since the described apparatus may be changed in details by those skilled in the art, in order to adapt this apparatus to various requirements, without departing from the scope of the following claims.

We claim:

1. For use in conjunction with a one-wheel trailer having a normal upright position and adapted to be pulled by the frame of a "cycle," such as a bicycle, motorcycle or moped, universal-joint trailer hitch apparatus comprising:
   a trailer frame for said one-wheel trailer having a transverse elongated frame member with a cylindrical rounded surface,
   said elongated frame member extending horizontally transverse to the length of said one-wheel trailer when said trailer is in said normal upright position,
   mounting means including attachment means for attaching said mounting means to the frame of the cycle for pulling the one-wheel trailer,
   upper and lower wafer-like annular sector bearing elements positioned one above the other in spaced parallel relationship,
   each of said sector bearing elements having a plurality of radially extending cylindrical concave bearing surfaces in juxtaposition with each other,
   said upper sector bearing element being positioned above said elongated frame member with the concave bearing surface thereof engaged down against the cylindrical rounded surface of said elongated frame member,
   said lower sector bearing element being positioned below said elongated frame member with the concave bearing surface thereof engaged up against the cylindrical rounded surface of said elongated frame member being journaled between the respective concave bearing surfaces of said upper and lower sector bearing elements for providing a transverse pivot axis,
   said upper sector bearing element having an upwardly projecting centrally located trunnion with an upwardly facing thrust surface encircling said trunnion, said lower sector bearing element having a downwardly projecting centrally located trunnion with a downwardly facing thrust surface encircling said latter trunnion, said two trunnions being aligned for defining a vertical pivot axis, said mounting means having a hole for receiving the trunnion of said lower sector bearing element and having a surface complementary with the thrust surface which encircles said lower sector trunnion for engaging against said thrust surface, a cap plate having a hole for receiving the trunnion of said upper sector bearing element and having a surface complementary with the the thrust surface which encircles said hinge means pivotally connecting one end of said cap plate to said mounting means, and clamping means for urging the other end of said cap plate toward said mounting means.

2. A universal-joint hitch apparatus as set forth in claim 1, wherein said clamping means includes a threaded bolt and a hand nut.

3. A universal-joint hitch apparatus as set forth in claim 2, wherein said hand nut includes a handle having a sloping protrusion, wherein said protrusion collides glancingly with the end of an aforesaid trunnion when said hand nut is screwed into clamping relation, whereby said glancing collision is slight enough to permit said hand nut to be hand-screwed past said trunnion to complete said clamping relation but is obtrusive enough to prevent said hand nut from unscrewing under the buffeting of service.

* * * * *